US010766181B2

United States Patent
Paranthaman et al.

(10) Patent No.: US 10,766,181 B2
(45) Date of Patent: Sep. 8, 2020

(54) MAGNETIC FEED MATERIAL AND ITS USE IN PRODUCING BONDED PERMANENT MAGNETS BY ADDITIVE MANUFACTURING

(71) Applicants: UT-Battelle, LLC, Oak Ridge, TN (US); Magnet Applications Inc., DuBois, PA (US)

(72) Inventors: Mariappan Parans Paranthaman, Knoxville, TN (US); Ling Li, Austin, TX (US); Vlastimil Kunc, Knoxville, TN (US); Brian K. Post, Knoxville, TN (US); Orlando Rios, Knoxville, TN (US); Robert H. Fredette, DuBois, PA (US); John Ormerod, Loudon, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 217 days.

(21) Appl. No.: 15/796,110

(22) Filed: Oct. 27, 2017

(65) Prior Publication Data
US 2018/0117818 A1    May 3, 2018

Related U.S. Application Data

(60) Provisional application No. 62/413,668, filed on Oct. 27, 2016.

(51) Int. Cl.
*B29C 67/00* (2017.01)
*B29C 48/00* (2019.01)
(Continued)

(52) U.S. Cl.
CPC ........ *B29C 48/022* (2019.02); *B29C 48/0022* (2019.02); *B29C 48/04* (2019.02);
(Continued)

(58) Field of Classification Search
CPC .......... H01F 1/0578; B29K 2995/0008; B29K 2103/06; C08K 2003/0856; C08K 2003/0843; B33Y 10/00; B29C 48/0022
See application file for complete search history.

(56) References Cited

U.S. PATENT DOCUMENTS 3,918,867 A * 11/1975 Beyer ...................... B22F 3/20
                                                                425/174
5,147,722 A *  9/1992 Koslow ................. B29C 67/243
                                                                264/122

(Continued)

OTHER PUBLICATIONS

Garrell et al., "Mechanical Properties of Nylon bonded Nd—Fe—B permanent magnets", J. Magnetism and Magnetic Materials 257 (2003) 32-43, cited in IDS. (Year: 2003) (Year: 2003).*

(Continued)

*Primary Examiner* — Ryan M Ochylski
(74) *Attorney, Agent, or Firm* — Scully, Scott, Murphy & Presser, P.C.

(57) ABSTRACT

A method for producing magnet-polymer pellets useful as a feedstock in an additive manufacturing process, comprising: (i) blending thermoplastic polymer and hard magnetic particles; (ii) feeding the blended magnet-polymer mixture into a pre-feed hopper that feeds directly into an inlet of a temperature-controlled barrel extruder; (iii) feeding the blended magnet-polymer mixture into the barrel extruder at a fixed feed rate of 5-20 kg/hour, wherein the temperature at the outlet is at least to no more than 10° C. above a glass transition temperature of the blended magnet-polymer mixture; (iv) feeding the blended magnet-polymer mixture directly into an extruding die; (v) passing the blended magnet-polymer mixture through the extruding die at a fixed speed; and (vi) cutting the magnet-polymer mixture at regular intervals as the mixture exits the extruding die at the (Continued)

fixed speed. The use of the pellets as feed material in an additive manufacturing process is also described.

26 Claims, 2 Drawing Sheets

(51) Int. Cl.

| | |
|---|---|
| *B29C 64/314* | (2017.01) |
| *H01F 1/057* | (2006.01) |
| *B29C 48/04* | (2019.01) |
| *B29C 48/875* | (2019.01) |
| *H01F 41/02* | (2006.01) |
| *B29C 48/92* | (2019.01) |
| *B29C 48/80* | (2019.01) |
| *C08K 3/08* | (2006.01) |
| *B29C 64/106* | (2017.01) |
| *B33Y 10/00* | (2015.01) |
| *B33Y 70/00* | (2020.01) |
| *B29K 77/00* | (2006.01) |
| *B29K 103/06* | (2006.01) |
| *B29K 505/12* | (2006.01) |

(52) U.S. Cl.
CPC ............ *B29C 48/83* (2019.02); *B29C 48/875* (2019.02); *B29C 48/92* (2019.02); *B29C 64/314* (2017.08); *H01F 1/0572* (2013.01); *H01F 1/0578* (2013.01); *H01F 41/0253* (2013.01); *B29C 64/106* (2017.08); *B29C 2948/92209* (2019.02); *B29C 2948/92704* (2019.02); *B29C 2948/92895* (2019.02); *B29K 2077/00* (2013.01); *B29K 2103/06* (2013.01); *B29K 2505/12* (2013.01); *B29K 2995/0008* (2013.01); *B33Y 10/00* (2014.12); *B33Y 70/00* (2014.12); *C08K 3/08* (2013.01); *C08K 2003/0856* (2013.01); *C08K 2201/01* (2013.01)

(56) References Cited

U.S. PATENT DOCUMENTS

| | | | | |
|---|---|---|---|---|
| 5,470,400 | A | * | 11/1995 | Bogatin ................ B22F 1/0088 148/301 |
| 2002/0084439 | A1 | | 7/2002 | Hart et al. |
| 2008/0199118 | A1 | | 8/2008 | Yabe et al. |
| 2013/0241334 | A1 | * | 9/2013 | Zernikow ............. H01F 7/0221 310/154.01 |
| 2014/0197911 | A1 | | 7/2014 | Ozaki et al. |
| 2015/0171717 | A1 | * | 6/2015 | Wakade ................ B22F 3/1007 29/598 |
| 2016/0158980 | A1 | | 6/2016 | Fitzpatrick |
| 2018/0294083 | A1 | * | 10/2018 | Dietsch .................... C08J 3/201 |

OTHER PUBLICATIONS

Huber et al., "3D print of polymer bonded rare-earth magnets, and 3D magnetic field scanning with an end-user 3D printer", Applied Physics Letters 109 (2016), 162401-1-162401-4. (Year: 2016) (Year: 2016).*

Holshouser et al.,"Out of Bounds Additive Manufacturing", Advanced Materials and Processes, p. 15-17 (2013), cited in IDS. (Year: 2013) (Year: 2013).*
Heaney et al., "Molding of Components in Metal Injection Molding (MIM)" (2012) ISBN 978-0-85709-623-4 (Year 2012).*
Omnexus—Table of Plastics Glass Transition Temperature Omnexus. specialchem.com Retrieved from Internet Archive Wayback Machine, archived Nov. 14, 2015 (Year: 2015).*
Giles et al., "Extrusion—The Definitive Processing Guide and Handbook" (William Andrew Publ., 2005) Table of Polyamide Resins Melt Temperatures and Processing Temeperatures ISBN 978-0-8155-1473-2 (Year: 2005).*
Holshouser, C. et al., "Out of Bounds Additive Manufacturing," Advanced Materials & Processes, (Mar. 2013), pp. 15-17.
Paranthaman, M.P. et al., "Binder Jelling: A Novel NdFeB Bonded Magnet Fabrication Process," The Minerals, Metals & Materials Society, (2016), vol. 68, No. 7, pp. 1978-1982, DOI: 10.1007/s11837-016-1883-4.
Compton, B.G. et al., "Direct-write 3D printing of NdFeB bonded magnets," Materials and Manufacturing Processes, (Aug. 2016), 5 pages, http://dx.doi.org/10.1080/10426914.2016.1221097.
Dehoff, R. et al., "Case Study: Additive Manufacturing of Aerospace Brackets," Advanced Materials & Processes, (Mar. 2013), pp. 19-22.
Garrell, M.G., et al., "Mechanical properties of Nylon bonded Nd—Fe—B permanent magnets," Journal of Magnetism and Magnetic Materials, (2003), 257, pp. 32-43.
Li L. et al., "A novel method combining additive manufacturing and alloy infiltration for NdFeB bonded magnet fabrication," Journal of Magnetism and Magnetic Materials, (2017), 438, pp. 163-167, http://dx.doi.org/10.1016/j.jmmm.2017.04.066.
Li L. et al. "Big Area Additive Manufacturing of High Performance Bonded NdFeB Magnets," Scientific Reports, (2016), 7 pages, DOI: 10.1038/srep36212.
Li L. et al. "Additive manufacturing of near-net-shape bonded magnets: Prospects and challenges," Scripta Materialia, (2017), 135, pp. 100-104, http://dx.doi.org/10.1016/j.scriptamat.2016.12.035.
Nlebedim, I.C. et al., "Studies on in situ magnetic alignment of bonded anisotropic Nd—Fe—B alloy powders," Journal of Magnetism and Magnetic Materials, (2017), 422, pp. 168-173, http://dx.doi.org/10.1016/j.jmmm.2016.08.090.
Paranthaman, M.P. et al., "Additive Manufacturing of Permanent Magnets," Sigma-Aldrich, 2016, pp. 1-9.
Talagani, F. et al., "Numerical Simulation of Big Area Additive Manufacturing (3D Printing) of a Full Size Car," SAMPE Journal, (2015), vol. 51, No. 4, pp. 27-36.
Watkins, T. et al., "Neutron Characterization for Additive Manufacturing," Advanced Materials & Processes, (Mar. 2013), pp. 23-27.
International Search Report dated Feb. 9, 2018 issued in PCT/US17/58715.
Ma, B.M., et al., "Recent development in bonded NdFeB magnets", Journal of Magnetism and Magnetic Materials, 2002, pp. 418-423, 239.
Li, L., et al., "Fabrication of highly dense isotropic Nd—Fe—B nylon bonded magnets via extrusion-based additive manufacturing", Additive Manufacturing, 2018, pp. 495-500, 21.

* cited by examiner

MAGNETIC FEED MATERIAL AND ITS USE IN PRODUCING BONDED PERMANENT MAGNETS BY ADDITIVE MANUFACTURING

CROSS REFERENCE TO RELATED APPLICATION

The present application claims benefit of U.S. Provisional Patent Application No. 62/413,668, filed on Oct. 27, 2016, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates generally to bonded permanent magnets and methods for producing them. The invention also relates to additive manufacturing methods, such as 3D printing, binder jetting, and big area additive manufacturing (BAAM).

BACKGROUND OF THE INVENTION

Permanent bonded magnets are well known. Bonded permanent magnets are typically fabricated by blending magnetic powders with a polymer as binder, and then molding the blend into desired shapes utilizing several commercial processing methods including injection molding, compression molding, extrusion, and calendering. Recently, bonded permanent magnets have experienced accelerated industrial applications due to their advantages, such as ability to be produced in intricate shapes, low weight and cost, superior mechanical properties and corrosion resistance. $Nd_2Fe_{14}B$ is a particularly well known permanent magnet used in many industrial applications. $Nd_2Fe_{14}B$ is known to adopt a tetragonal crystal structure (P42/mnm) with the easy magnetic axis along the c axis (Herbst, J. F., et al. *Phys. Rev. B.* 29, 4176-4178, 1984). $Nd_2Fe_{14}B$ possesses a magnetic energy as large as 512 kJ/m³ (64 MGOe), with a Curie temperature $T_c$=585 K and a high magnetic anisotropy constant $K_1$ of 4.5 MJ/m³ arising from the strong spin-orbit coupling in Nd (Sagawa, M., et al. J. Appl. Phys. 57, 4094, 1985. Magnet powder properties, processing temperature, loading factor, magnet density and degree of orientation are critical process variables for improving magnetic and mechanical properties of NdFeB bonded magnets.

However, current methods for producing them are being significantly challenged by an increasing demand for bonded permanent magnets of various intricate shapes and sizes, and with higher mechanical and magnetic field strengths. Although some additive manufacturing methods, such as binder jetting, have been attempted for producing bonded permanent magnets, the bonded magnet often exhibits substandard hard magnetic properties due to limitations in producing sufficiently dense parts. The bonded permanent magnets of the art also commonly exhibit a variability in magnetic strength throughout the part, which can be unacceptable in certain applications. Considering the above, there would be a significant advantage in a method that could produce permanent bonded magnets of any desired shape, intricacy, and size, and with higher than conventional mechanical strengths and magnetic field strengths, along with an improved uniformity of the magnetic field and physical properties throughout the bonded part.

SUMMARY OF THE INVENTION

In a first aspect, the present disclosure is directed to a method for producing uniformly sized magnet-polymer pellets that can be used as feed material in an additive manufacturing (AM) process for producing permanent bonded magnets of any of a variety of shapes, sizes, and intricacies, with exceptional mechanical and magnetic field strengths, and with improved uniformity in magnetic and physical properties throughout the bonded part. The method is more specifically accomplished by the following steps: (i) blending thermoplastic polymer and particles having a hard magnetic material composition to produce a blended magnet-polymer mixture, wherein the thermoplastic polymer has a melting point of at least 175° C.; (ii) feeding the blended magnet-polymer mixture into a pre-feed hopper having a powered auger at an outlet of the pre-feed hopper, wherein the outlet feeds directly into an inlet of a temperature-controlled barrel extruder; (iii) feeding the blended magnet-polymer mixture from step (ii) into the temperature-controlled barrel extruder at a fixed feed rate of 5-20 kg/hour, pushing the blended magnet-polymer mixture from the inlet to an outlet of the temperature-controlled barrel extruder, and subjecting the blended magnet-polymer mixture to an increasing temperature gradient from the inlet to the outlet of the temperature-controlled barrel extruder, wherein the temperature at the outlet is at least to no more than 10° C. above a glass transition temperature of the blended magnet-polymer mixture; (iv) feeding the blended magnet-polymer mixture at the outlet of the barrel extruder directly into an extruding die, wherein the extruding die is set at a temperature below the temperature of the outlet of the barrel extruder and below the glass transition temperature of the blended magnet-polymer mixture, to cool and harden the blended magnet-polymer mixture; (v) passing the blended magnet-polymer mixture from step (iv) through the extruding die at a fixed speed to produce a shaped and hardened form of the magnet-polymer mixture exiting the extruding die at the fixed speed; and (vi) cutting the shaped and hardened form of the magnet-polymer mixture at regular intervals as the shaped and hardened form of the magnet-polymer mixture exits the extruding die at the fixed speed, to produce hardened magnet-polymer pellets composed of the magnet-polymer mixture, wherein the hardened pellets are of uniform size by virtue of the fixed speed and cutting at regular intervals.

In a second aspect, the present disclosure is directed to an additive manufacturing process in which the above-described hardened magnet-polymer pellets, as produced in the process described above, are used as feed material (feedstock) in an additive manufacturing process (e.g., a big area additive manufacturing (BAAM) system) to produce a bonded permanent magnet. In the case of a BAAM process, by virtue of the unbounded build space afforded by the BAAM system, a bonded permanent magnet of unlimited size can be produced, or alternatively, a structure of unlimited size (e.g., a motor, engine, vehicle, or industrial machine) and shape can be produced in which a component of the structure is magnetic. The method is more specifically accomplished by the following steps: (i) incorporating the hardened pellets into at least one deposition head of at least one multi-axis robotic arm of a BAAM system, wherein the deposition head performs melting, compounding, and extruding functions, and the BAAM system has an unbounded open-air build space; and (ii) depositing an extrudate of the hardened pellets from the deposition head, the extrudate being at a temperature above the glass transition temperature of the hardened pellets when exiting an orifice of the deposition head, and depositing the extrudate layer-by-layer from the deposition head until an object is formed with the extrudate, and allowing the extrudate to cool after each deposition, to produce the bonded permanent magnet. In the layer-by-layer deposition, the extrudate is allowed to cool after each deposition to produce the bonded permanent magnet. The method advantageously provides a bonded permanent magnet that retains the magnetic properties of the particles having a hard magnetic material composition without a loss in the magnetic properties.

DETAILED DESCRIPTION OF THE INVENTION

In one aspect, the present disclosure is directed to a method for producing magnet-polymer pellets useful as a feedstock in an additive manufacturing process. The method includes; (i) blending thermoplastic polymer and particles having a hard magnetic material composition to produce a blended magnet-polymer mixture, wherein the thermoplastic polymer has a melting point of at least 175° C.; (ii) feeding the blended magnet-polymer mixture into a pre-feed hopper having a powered auger at an outlet of the pre-feed hopper, wherein the outlet feeds directly into an inlet of a temperature-controlled barrel extruder; (iii) feeding the blended magnet-polymer mixture from step (ii) into the temperature-controlled barrel extruder at a fixed feed rate of 5, 10, 15, or 20 kg/hour (or within a range thereof), pushing the blended magnet-polymer mixture from the inlet to an outlet of the temperature-controlled barrel extruder, and subjecting the blended magnet-polymer mixture to an increasing temperature gradient from the inlet to the outlet of the temperature-controlled barrel extruder, wherein the temperature at the outlet is at least to no more than 10° C. (or no more than 5° C.) above a glass transition temperature of the blended magnet-polymer mixture; (iv) feeding the blended magnet-polymer mixture at the outlet of the barrel extruder directly into an extruding die, wherein the extruding die is set at a temperature below the temperature of the outlet of the barrel extruder and below the glass transition temperature of the blended magnet-polymer mixture, to cool and harden the blended magnet-polymer mixture; (v) passing the blended magnet-polymer mixture from step (iv) through the extruding die at a fixed speed (e.g., 5, 10, 15, or 20 kg/hour) to produce a shaped and hardened form of the magnet-polymer mixture exiting the extruding die at the fixed speed; and (vi) cutting the shaped and hardened form of the magnet-polymer mixture at regular intervals as the shaped and hardened form of the magnet-polymer mixture exits the extruding die at the fixed speed, to produce hardened magnet-polymer pellets composed of the magnet-polymer mixture, wherein the hardened pellets are of uniform size by virtue of the fixed speed and cutting at regular intervals. The hardened pellets may have a size of, for example, at least 1, 2, 3, 4, 5, or 10 mm, or a size within a range between any two of these values.

In some embodiments, the increasing temperature gradient from the inlet to the outlet of the temperature-controlled barrel extruder is provided by at least two temperature zones differing in temperature, wherein the temperature zones increase in temperature from the inlet to the outlet of the temperature-controlled barrel extruder. The temperature of the zone closest to the outlet is at least but no more than 5° C. or 10° C. above a glass transition temperature of the blended magnet-polymer mixture. In different embodiments, precisely or at least two, three, or four temperature zones are employed. A temperature zone at the inlet may be precisely, at least, or above, for example, 150° C., 155° C., 160° C., 165° C., 170° C., 175° C., 180° C., 185° C., 190° C., 195° C., 200° C., 205° C., or 210° C., or a temperature within a range therein. A temperature zone at the outlet may be precisely, at least, or above, for example, 170° C., 175° C., 180° C., 185° C., 190° C., 195° C., 200° C., 205° C., or 210° C., or a temperature within a range therein, provided that the temperate at the outlet is above the temperature at the inlet. In some embodiments, the temperature at the outlet is no more than 20, 15, or 10° C. above the temperature at the outlet. In further embodiments, the temperature-controlled barrel extruder includes a twin screw compounder that compounds the blended magnet-polymer mixture from the inlet to the outlet of the temperature-controlled barrel extruder.

In a second aspect, the present disclosure is directed to methods for producing a bonded permanent magnet by feeding the magnet-polymer pellets, as produced by the method described above, into an additive manufacturing (AM) device, and operating the AM device to produce a bonded permanent magnet from the magnet-polymer pellets. The AM process can be any of the additive processes well known in the art, such as a rapid prototyping unit, such as a fused deposition modeling (FFF) device, or more particularly, a 3D printer. As well known in the art, the additive process generally operates by hot extruding a composite through a die or nozzle of a suitable shape and repeatedly depositing discrete amounts (e.g., beads) of the composite fiber in designated locations to build a structure. The temperature employed in the additive process is generally a temperature at which the composite is extrudable but not in a completely melted state, i.e., a temperature below the melting temperature of the polymer. Upon exiting the die (i.e., nozzle) in the additive processing unit, the composite material cools and solidifies. In the FFF or 3D printing process, the nozzle is moved in precise horizontal and vertical positions as beads of the composite are deposited. The beads of composite are sequentially deposited to build a magnetic object, layer by layer. The nozzle movements and flow rate of the composite are generally controlled by computer software, typically a computer-aided manufacturing (CAM) software package. The FFF or 3D printer builds an object (article) based on instructions provided by a computer program that includes precise specifications of the object to be constructed.

In particular embodiments, magnet-polymer pellets are employed as a solid precursor material (i.e., feed) in a BAAM process. As well known in the art, the BAAM process employs an unbounded open-air build space in which at least one, and typically, a multiplicity, of deposition heads controlled by one or a multiplicity of multi-axis robotic arms operate in concert to construct an object. In the BAAM process, the feed material is processed within and ultimately deposited from the deposition head layer-by-layer as an extrudate, which cools over time to produce the bonded permanent magnet. The BAAM process considered herein may use only the hard magnet precursor material as feed for the entire BAAM process, or the BAAM process may employ the hard magnet precursor as feed in one or more deposition heads and may employ another (non-magnetic) feed in one or more other deposition heads to construct an object with magnetic and non-magnetic portions. As well known, the deposition head in a BAAM process is designed to combine melting, compounding, and extruding functions to produce and deposit an extrudate of the precursor material layer-by-layer. The deposition heads are moved and precisely positioned by the multi-axis robotic arm, which can be either stationary or mounted on a multi-axis or conventional three-axis gantry system. The multi-axis robotic arms are, in turn, instructed by a computer program, as generally provided by a computer-aided manufacturing (CAM) software package. As also well known, in the BAAM process, one deposition head may be partly or solely responsible for building a specific region of the overall object, but generally coordinates with at least one other deposition head, which is involved in building another region of the overall object. The BAAM process is described in detail in, for example, C. Holshouser et al., *Advanced Materials & Processes*, 15-17, March 2013, and M. R. Talgani et al., *SAMPE Journal*, 51(4), 27-36, July/August 2015, the contents of which are herein incorporated by reference in their entirety.

The thermoplastic polymer can be any polymer that can be melted, compounded, and extruded in the deposition head of a BAAM system. The thermoplastic polymer should also have the ability to harden after deposition and cooling. For purposes of the invention, the thermoplastic polymer preferably has a melting point of at least or above 175° C., 180° C., 185° C., 190° C., 195° C., 200° C., 225° C., 250° C., 275° C., or 300° C. Some examples of such thermoplastic polymers include polyamides (e.g., Nylon 6,6), polyphenylene sulfide, polyphenylene oxide, acrylonitrile butadiene styrene, polyether ether ketone, polyoxymethylene, polyether sulfone, polycarbonates, polyetherimide, polyvinyl addition polymers (e.g., polyacrylonitrile, polyvinylchloride, polytetrafluoroethylene, and polystyrene), polyesters, and polybenzimidazole. In some embodiments, the thermoplastic polymer is a homopolymer, which may have any of the above compositions. In other embodiments, the thermoplastic polymer is a copolymer, which may be, for example, a block, alternating, random, or graft copolymer.

In some embodiments, the thermoplastic polymer is crosslinkable. In more particular embodiments, the thermoplastic crosslinkable polymer behaves as a pliable thermoplastic material at relatively low temperature during deposition of the precursor material, while being able to transform into a hardened durable non-pliable thermoset state after deposition and construction of the magnetic object. The thermoplastic crosslinkable polymer (i.e., polymeric binder) has a characteristic of a delayed crosslinking reaction to the extent that a majority of the crosslinking occurs after the solid precursor material has been melted, extruded, and deposited on a substrate. By virtue of this crosslinking ability, the polymeric binder functions initially as a thermoplastic and then as a thermoset after crosslinking. Thus, the polymeric binder can be considered a hybrid polymer, i.e., having characteristics of both a thermoplastic and a thermoset. However, at the thermoset stage, the polymeric binder forms a three-dimensional covalent network, and thus, cannot revert back to a thermoplastic state, as expected for a thermoset polymer. In some embodiments, the thermoplastic polymer is not crosslinkable.

In order to possess this hybrid characteristic, the polymeric binder possesses groups that ultimately undergo crosslinking, either with the same or other groups in the same polymer, or with the same or other groups in a different polymer or compound (e.g., a rapid or latent crosslinking agent) that has been admixed with the polymeric binder. In conventional fused deposition modeling (FDM), the polymer feed material is simply melted and extruded directly onto a cold or warm plate, or onto a prior build layer. These applications require materials that are spatially locked in place immediately after deposition and maintain tolerance during thermal cycling. Since out-of-the-box heating requires localized deposition of energy to promote layer-to-layer bonding, part distortion is a limiting factor when building high strength components.

The hybrid polymers exhibit a broad thermal activation window that facilitates rapid pre-polymer formation at slightly elevated temperatures without full crosslinking. The hybrid polymer is preferably a reactive polymer, such as polyurethane and/or epoxy, which may be reacted with rapid or latent crosslinking agents, such as moisture provided by a humid environment in the case of urethanes, or an aromatic amine and a polyphenol in the case of epoxies. Typical FDM employs a three-step process, namely, melt, deposit and solidify, while embodiments of this invention can include a five-step process: melt, partially crosslink to achieve desired viscosity, deposit, solidify, and initiate extensive crosslinking. In other embodiments, application of an electromagnetic field can also be used to align aromatic polymer structures for crosslinking between layers. The formation of chemical bonds across layers can improve z-strength and enable incorporation of a large fraction of second phase reinforcements, such as carbon fiber, both of which are currently limited in polymer 3D printing. The crosslinkable polymers used in the method of this invention also provide the advantage of chemically bonding (crosslinking) layers with underlying or previously deposited layers to improve inter-layer adhesion and strength of the deposited part.

The hybrid crosslinkable polymers can minimize distortion during a build, increase layer-to-layer adhesion, and/or minimize anisotropy in the part that results from poor interlayer adhesion. The traditional thermoplastic approach with FDM relies on the molten extruded material to solidify on top of a previous deposit, which is typically held at an elevated temperature, but well below the melting temperature of the material. In this condition, the interaction between the newly extruded material and previous deposit is minimal, as there is very little penetration and entanglement of molecules from the molten material into the previous deposit. Even when the previous deposit is held at an elevated temperature, the surface may become "tacky," but the intermolecular bonding between the deposition layers remains low.

Using the hybrid polymers, the solidification process is a chemically driven polymerization process, rather than solely a thermally driven phase change as with thermoplastics. Hybrid polymers possess unique rheological characteristics well suited for additive manufacturing of bonded permanent magnets. As discussed above, the hybrid polymers are solid at room temperature and melt at elevated temperatures, yet can crosslink to form a thermoset. In embodiments of this invention, these polymers act as thermoplastics during deposition, and as thermosets after deposition. During the conventional deposition of thermosets, a monomer material is deposited in liquid form, and the crosslinking process that solidifies the thermoset material is irreversible and may be driven by time, heat, a chemical reaction, and/or irradiation. In the case of additive manufacturing according to embodiments of this invention, the concept is to crosslink the material using a chemical reaction and maintain a low temperature gradient within the part. The catalyst that initiates the crosslinking process may be, for example, a secondary chemical mixed with the deposited material during or just prior to deposition, or the crosslinking may be initiated with exposure to air.

Exemplary hybrid polymers include, for example, polyurethanes, epoxy-containing polymers, and polymers containing vinyl acetate units. The hybrid polymer may include a backbone and/or pendant groups that are aromatic, in which case the hybrid polymer may be referred to as an "aromatic polymer". In embodiments of this invention, the polymer material is prepared with a rapid or latent crosslinking agent, such as moisture provided by a humid environment in the case of urethanes, or an aromatic amine and/or a polyphenol in the case of epoxies. The polymer can be blended with a limited quantity of a first curing agent to obtain a partially reacted pre-polymer at moderate temperatures, such as during melt extrusion, and a second less reactive curing agent, such as a phenolic curing agent, for higher temperature curing.

The particles having a hard magnetic material composition (i.e., "magnetic particles") can have any suitable particle size, but typically no more than or less than 1 mm, 0.5 mm, 200 microns, 100 microns, 50 microns, 1 micron, 0.5 micron, 0.2 micron, or 0.1 micron, or a distribution of particles bounded by any two of these values. The magnetic particles can be, for example, nanoparticles (e.g., 1-500 nm) or microparticles (e.g., 1-500 microns). The term "hard magnetic material composition" refers to any of the ferromagnetic of ferrimagnetic compositions, known in the art, that exhibit a permanent magnetic field with high coercivity (i.e., without a continuous current supply), generally at least or above 300, 400, or 500 Oe. Thus, the magnetic particles considered herein are not paramagnetic or superparamagnetic particles. The magnetic particles may be magnetically isotropic or anisotropic, and may have any desired shape, e.g., substantially spherical, ovoid, filamentous, or plate-like.

Typically, the permanent magnet composition is metallic or a metal oxide, and often contains at least one element selected from iron, cobalt, nickel, copper, gallium, and rare earth elements, wherein the rare earth elements are generally understood to be any of the fifteen lanthanide elements along with scandium and yttrium. In particular embodiments, the permanent magnet composition includes iron, such as magnetite, lodestone, or alnico. In other particular embodiments, the permanent magnet composition contains at least one rare earth element, particularly samarium, praseodymium, and/or neodymium. A particularly well-known samarium-based permanent magnet is the samarium-cobalt (Sm—Co alloy) type of magnet, e.g., $SmCo_5$ and $Sm_2Co_{17}$. A particularly well-known neodymium-based permanent magnet is the neodymium-iron-boron (Nd—Fe—B) type of magnet, typically having the formula $Nd_2Fe_{14}B$. Other rare earth-containing hard magnetic material compositions include, for example, $Pr_2Co_{14}B$, $Pr_2Fe_{14}B$, and Sm—Fe—N. The hard magnet material may or may not have a composition that excludes a rare earth metal. Some examples of non-rare earth hard magnetic materials include MnBi, AlNiCo, and ferrite-type compositions, such as those having a Ba—Fe—O or Sr—Fe—O composition. Particle versions of such magnetic compositions are either commercially available or can be produced by well-known procedures, as evidenced by, for example, P. K. Deheri et al., "Sol-Gel Based Chemical Synthesis of $Nd_2Fe_{14}B$ Hard Magnetic Nanoparticles," *Chem. Mater.*, 22 (24), pp. 6509-6517 (2010); L. Y. Zhu et al., "Microstructural Improvement of NdFeB Magnetic Powders by the Zn Vapor Sorption Treatment," *Materials Transactions*, vol. 43, no. 11, pp. 2673-2677 (2002); A. Kirkeminde et al., "Metal-Redox Synthesis of MnBi Hard Magnetic Nanoparticles," *Chem. Mater.*, 27 (13), p. 4677-4681 (2015); and U.S. Pat. No. 4,664,723 ("Samarium-cobalt type magnet powder for resin magnet"). The permanent magnet composition may also be a rare-earth-free type of magnetic composition, such as a Hf—Co or Zr—Co alloy type of permanent magnet, such as described in Balamurugan et al., *Journal of Physics: Condensed Matter*, vol. 26, no. 6, 2014, the contents of which are herein incorporated by reference in their entirety. In some embodiments, any one or more of the above-described types of magnetic particles are excluded from the magnet-polymer pellets and resulting bonded permanent magnet produced after additive manufacturing.

The magnetic particles are generally included in the magnet-polymer pellets in an amount of at least or above 20 wt. % by weight of the polymer binder and magnetic particles (or alternatively, by weight of the magnet-polymer pellets). In different embodiments, the magnetic particles are included in an amount of at least or above 20, 30, 40, 50, 60, 70, 80, 90, 92, 95, or 98 wt. %, or in an amount within a range bounded by any two of the foregoing values. Alternatively, the magnetic particles are included in the magnet-polymer pellets in an amount of at least or above 40, 45, 50, 55, 60, 65, 70, 75, or 80 vol %.

In some embodiments, the magnet-polymer pellets may or may not further include non-magnetic particles having a composition that confers additional tensile strength to the bonded magnetic after curing. The non-magnetic particles can be composed of, for example, carbon, metal oxide, or metal carbon particles. The particles may have any suitable morphology, including, for example, spheroidal particles or filaments. The particles may be present in the magnet-polymer pellets in any desired amount, e.g., at least or above 1, 2, 5, 10, 20, 30, 40, or 50 wt. %, or in an amount within a range bounded by any two of the foregoing values. The term "filament," as used herein, refers to a particle having a length dimension at least ten times its width dimension, which corresponds to an aspect ratio (i.e., length over width) of at least or above 10:1 (i.e., an aspect ratio of at least 10). In different embodiments, the filament has an aspect ratio of at least or above 10, 20, 50, 100, 250, 500, 1000, or 5000. In some embodiments, the term "filament" refers only to particles having one dimension at least ten times greater than the other two dimensions. In other embodiments, the term "filament" also includes particles having two of its dimensions at least ten times greater than the remaining dimension, which corresponds to a platelet morphology. Notably, the magnetic particles may also (and independently) have a spheroidal, platelet, or elongated (e.g., filamentous) morphology. In some embodiments, the magnetic particles are filaments having any of the aspect ratios described above. Notably, magnetic particles having an anisotropic (e.g., elongated or filamentous) shape are generally more amenable to alignment in a directional magnetic field.

In particular embodiments, carbon filaments are included in the magnet-polymer pellets. The carbon filaments can be, for example, carbon fibers, carbon nanotubes, platelet nanofibers, graphene nanoribbons, or a mixture thereof. In the case of carbon fibers, these may be any of the high-strength carbon fiber compositions known in the art. Some examples of carbon fiber compositions include those produced by the pyrolysis of polyacrylonitrile (PAN), viscose, rayon, lignin, pitch, or polyolefin. The carbon nanofibers may also be vapor grown carbon nanofibers. The carbon fibers can be micron-sized carbon fibers, generally having inner or outer diameters of 1-20 microns or sub-range therein, or carbon nanofibers, generally having inner or outer diameters of 10-1000 nm or sub-range therein. In the case of carbon nanotubes, these may be any of the single-walled or multi-walled carbon nanotubes known in the art, any of which may or may not be heteroatom-doped, such as with nitrogen, boron, oxygen, sulfur, or phosphorus. The carbon filament, particularly the carbon fiber, may possess a high tensile strength, such as at least 500, 1000, 2000, 3000, 5000, or 10,000 MPa. In some embodiments, the carbon filament, particularly the carbon fiber, possesses a degree of stiffness of the order of steel or higher (e.g., 100-1000 GPa) and/or an elastic modulus of at least 50 Mpsi or 100 Mpsi.

In other embodiments, metal oxide filaments may or may not be included in the magnet-polymer pellets. The metal oxide filaments (also known as metal oxide nanowires, nanotubes, nanofibers, or nanorods), if present, can be, for example, those having or including a main group metal oxide composition, wherein the main group metal is generally selected from Groups 13 and 14 of the Periodic Table. Some examples of Group 13 oxides include aluminum oxide, gallium oxide, indium oxide, and combinations thereof. Some examples of Group 14 oxides include silicon oxide (e.g., glass), germanium oxide, tin oxide, and combinations thereof. The main group metal oxide may also include a combination of Group 13 and Group 14 metals, as in indium tin oxide. In other embodiments, the metal oxide filaments have or include a transition metal oxide composition, wherein the transition metal is generally selected from Groups 3-12 of the Periodic Table. Some examples of transition metal oxides include scandium oxide, yttrium oxide, titanium oxide, zirconium oxide, hafnium oxide, vanadium oxide, niobium oxide, tantalum oxide, chromium oxide, molybdenum oxide, tungsten oxide, manganese oxide, iron oxide, ruthenium oxide, cobalt oxide, rhodium oxide, iridium oxide, nickel oxide, palladium oxide, copper oxide, zinc oxide, and combinations thereof. The metal oxide filament may also include a combination of main group and transition metals. The metal oxide filament may also include one or more alkali or alkaline earth metals in addition to a main group or transition metal, as in the case of some perovskite nanowires, such as $CaTiO_3$, $BaTiO_3$, $SrTiO_3$, and $LiNbO_3$ nanowires, and as further described in X. Zhu, et al., *J. Nanosci. Nanotechnol.*, 10(7), pp. 4109-4123, July 2010, and R. Grange, et al., *Appl. Phys. Lett.*, 95, 143105 (2009), the contents of which are herein incorporated by reference. The metal oxide filament may also have a spinel composition, as in $Zn_2TiO_4$ spinel nanowires, as described in Y. Yang et al., *Advanced Materials*, vol. 19, no. 14, pp. 1839-1844, July 2007, the contents of which are herein incorporated by reference. In some embodiments, the metal oxide filaments are constructed solely of metal oxide, whereas in other embodiments, the metal oxide filaments are constructed of a coating of a metal oxide on a non-metal oxide filament, e.g., silica-coated or germanium oxide-coated carbon nanotubes, as described in M. Pumera, et al., *Chem Asian J.*, 4(5), pp. 662-667, May 2009, and M. Pumera, et al., *Nanotechnology*, 20(42), 425606, 2009, respectively, the contents of which are herein incorporated by reference. The metal oxide layer may alternatively be disposed on the surface of a metallic filament. The metal oxide filaments may also have any of the lengths and diameters described above.

In other embodiments, metal filaments may or may not be included in the metal-polymer pellets. The metal filaments (also known as metal nanowires, nanotubes, nanofibers, or nanorods), if present, can be, for example, those having or including a main group metal composition, such as a silicon, germanium, or aluminum composition, all of which are well known in the art. The metal filaments can also have a composition having or including one or more transition metals, such as nickel, cobalt, copper, gold, palladium, or platinum nanowires, as well known in the art. The metal filaments may also be doped with one or more non-metal dopant species, such as nitrogen, phosphorus, arsenic, or silicon to result in a metal nitride, metal phosphide, metal arsenide, or metal silicide composition. Many of these doped metal compositions are known to have semiconductive properties.

The magnet-polymer pellets may or may not also include an anti-oxidant compound. The anti-oxidant is generally of such composition and included in such amount as to help protect the magnetic particles from oxidizing during the additive manufacturing process. In some embodiments, the anti-oxidant is a phenolic compound, such as phenol or a substituted phenol (e.g., 2,6-di-t-butyl-4-methylphenol). In other embodiments, the anti-oxidant is a complexant molecule, such as EDTA. The anti-oxidant is typically included in the magnet-polymer pellets in an additive amount, typically up to or less than 5, 2, or 1 wt. %.

In some embodiments, the magnet-polymer pellets may or may not include one or more additional components that desirably modulate the physical properties of the resulting melt. In particular embodiments, a plasticizer is included, typically to promote plasticity (i.e., fluidity) and to inhibit melt-fracture during the extrusion and deposition process. The one or more plasticizers included in the magnet-polymer pellets can be any of the plasticizers well known in the art and appropriate for the particular polymer being extruded. For example, in a first embodiment, the plasticizer may be a carboxy ester compound (i.e., an esterified form of a carboxylic or polycarboxylic acid), such as an ester based on succinic acid, glutaric acid, adipic acid, terephthalic acid, sebacic acid, maleic, dibenzoic acid, phthalic acid, citric acid, and trimellitic acid. In a second embodiment, the plasticizer may be an ester-, amide-, or ether-containing oligomer, such as an oligomer of caprolactam, wherein the oligomer typically contains up to or less than 10 or 5 units. In a third embodiment, the plasticizer may be a polyol (e.g., a diol, triol, or tetrol), such as ethylene glycol, diethylene glycol, triethylene glycol, glycerol, or resorcinol. In a fourth embodiment, the plasticizer may be a sulfonamide compound, such as N-butylbenzenesulfonamide, N-ethyltoluenesulfonamide, or N-(2-hydroxypropyl)benzenesulfonamide. In a fifth embodiment, the plasticizer may be an organophosphate compound, such as tributyl phosphate or tricresyl phosphate. In a sixth embodiment, the plasticizer may be an organic solvent. The organic solvent considered herein is a compound that helps to soften or dissolve the polymer and is a liquid at room temperature (i.e., a melting point of no more than about 10, 20, 25, or 30° C.). Depending on the type of polymer, the organic solvent may be, for example, any of those mentioned above (e.g., ethylene glycol or glycerol), or, for example, a hydrocarbon (e.g., toluene), ketone (e.g., acetone or butanone), amide (e.g., dimethylformamide), ester (e.g., methyl acetate or ethyl acetate), ether (e.g., tetrahydrofuran), carbonate (e.g., propylene carbonate), chlorohydrocarbon (e.g., methylene chloride), or nitrile (e.g., acetonitrile). In some embodiments, one or more classes or specific types of any of the above plasticizers are excluded from the magnet-polymer pellets. In some embodiments, the plasticizer or other auxiliary component may be removed from the extrudate by subjecting the extrudate to a post-bake process that employs a suitably high temperature capable of volatilizing the plasticizer or other auxiliary component.

In particular embodiments, the magnet-polymer pellets containing the polymeric binder, and any other components to be melted and compounded with the magnet-polymer pellets, if any, are incorporated (fed) into one or more deposition heads of a BAAM system. Within the deposition head, the precursor material (the feed, including magnet-polymer pellets, which is charged into the deposition head) is melted and compounded before being extruded from an orifice of the deposition head. The extrudate, when exiting the orifice of the deposition head, is at a temperature above the glass transition temperature ($T_g$) of the precursor material. In some embodiments, in order to avoid a temperature that could denature the magnetic particles, the precursor material is heated to a temperature of no more than 5° C., 10° C., 15° C., or 20° C. above the glass transition temperature of the precursor material. Notably, the glass transition temperature of the precursor material is to be distinguished from the glass transition temperature or melting point of the thermoplastic polymer. In different embodiments, an extrudate of the precursor material exits the deposition head (and/or is initially deposited) at a temperature of at least 120° C., 130° C., 140° C., 150° C., 160° C., 165° C., 170° C., 175° C., 180° C., 185° C., 190° C., 195° C., 200° C., 225° C., 250° C., 275° C. or 300° C., or a temperature within a range bounded by any two of the foregoing exemplary temperatures.

The melt is extruded through a nozzle of the deposition head and deposited onto a platform from which the object will be removed, or the extrudate is deposited onto an existing portion of the object being manufactured to which the extrudate is being bonded. The extrudate is deposited layer-by-layer from the one or more deposition heads until an object is formed from the extrudate. As the extrudate exits the nozzle and is deposited, the extrudate cools, which results in solidification. In the case where a crosslinkable polymer is included in the extrudate, the deposition and cooling process leads to an increase in viscosity and a transition of the extrudate to a semi-solid or gel (i.e., a "solidified preform"). At this stage, an initial substantially incomplete level of crosslinking typically also occurs, before final hardening over time.

In some embodiments, as the extrudate exits the nozzle and is being deposited, the extrudate is exposed to a directional (external and non-varying) magnetic field of sufficient strength to align the particles having a hard magnetic composition. The alignment of the magnetic particles refers to at least an alignment of the individual magnetic fields (or poles) of the magnetic particles. In the case of anisotropically shaped magnetic particles, the alignment also involves a physical alignment, e.g., axial alignment of filamentous particles. In the case of a thermoplastic polymer containing aromatic groups, the polymer may also undergo alignment in the presence of a magnetic field by virtue of aligning and stacking of the aromatic groups. As the magnetic particles and/or thermoplastic polymer require an appreciable degree of freedom of movement to align themselves, the exposure to the directional magnetic field should occur at least during the time the precursor material is in a melted or partially melted form, i.e., before final solidification. Generally, in order for magnetic particles and/or thermoplastic polymer to sufficiently re-orient and align in the melt, the extrudate melt should possess a melt viscosity of up to or less than 20,000, 50,000, or 100,000 cPs, where cPs refers to a centipoise. However, in order to ensure that the extrudate maintains a shape when deposited, the melt on deposition should have a viscosity of at least 1,000, 2,000, 5,000, or 10,000 cPs. In order to sufficiently align the magnetic particles and/or thermoplastic polymer, the external magnetic field should generally have a magnetic field strength of at least 0.25 or 0.5 Tesla (0.25 T or 0.5 T). In different embodiments, the external magnetic field has a magnetic field strength of about, at least, above, up to, or less than, for example, 0.25, 0.5, 1, 1.2. 1.5, 2, 2.5, 3, 3.5, 4, 5, 6, 7 or 8 T.

In some embodiments, the extrudate after deposition is cooled over time, which leads to hardening and production of the hard magnetic bonded object. In the case where a crosslinkable polymer is included in the extruded, after the extrudate is deposited, and generally but not necessarily after a complete object of desired shape is constructed with the solidified preform, the solidified preform is cured by subjecting the solidified preform to conditions that result in substantial crosslinking to the extent that the thermoplastic behavior of the solidified preform transitions to thermoset behavior. At the curing stage, the transition to a thermoset generally coincides with an increase in viscosity of the solidified preform to a value substantially above 100,000 cPs, and typically, a value of at least or above 200,000, 500,000, or 1,000,000 cPs, and eventually, a transition to a completely non-flowable solid that may be characterized by the usual properties of a solid, e.g., tensile strength and elasticity.

In some embodiments, substantially complete crosslinking occurs by allowing the solidified preform to cool over time. The length of time may be any suitable period of time (e.g., hours or days) for the solidified preform to undergo substantially complete crosslinking. In other embodiments, the solidified preform is subjected to an energetic source that promotes or induces crosslinking. The energetic source may be, for example, thermal energy, electromagnetic irradiation (e.g., ultraviolet, x-ray or gamma-ray energy), or ion bombardment (e.g., electron or neutron beam irradiation).

The shape of the object that is ultimately built can be suited to any application in which a magnetic material having a significant degree of mechanical strength is desired, such as electrical motors. Although the shape of the magnetic material ultimately produced can be simple, e.g., a planar object, such as a film or coating of a desired two-dimensional shape (e.g., square or disc), the additive manufacturing process is primarily suited to the production of complex (i.e., intricate) shapes. Some examples of intricate shapes include rings, filled or unfilled tubes, filled or unfilled polygonal shapes having at least or more than four vertices, gears, and irregular (asymmetric) shapes. Other possible shapes include arcs with an angle greater than 90 degrees and less than 180 degrees, preferably in the range 120-160 degrees. The object may also be, for example, a functional motor, engine, or turbine.

In some embodiments, the bonded permanent magnet is coated with a polymer that functions to reduce exposure of the bonded permanent magnet to oxygen. The coating polymer can be, for example, an epoxy-based or silica-based polymer or hybrid thereof. In some embodiments, the coating polymer is a sol gel type of polymer, which may be a hybrid organic-inorganic polymer.

Examples have been set forth below for the purpose of illustration and to describe certain specific embodiments of the invention. However, the scope of this invention is not to be in any way limited by the examples set forth herein.

Examples

Preparation of Magnet-Polymer Pellets 65 vol % Nd—Fe—B powder (MQPB+, isotropic, premilled to 80 mesh) and 35 vol % Nylon-12 binder were blended were blended to a uniform mixture, which was fed into a pre-feed hopper with a powered auger on the outlet that feeds directly into the throat of the twin-screw barrels. The feed rate was precisely controlled to be 10 kg/hour to obtain uniform pellets. As the blended material traveled through the barrel on the twin screw compounder, the four zones were temperature controlled with the rear zone being the coolest (~195° C.) and the front zone being the warmest (~210° C.). The die was typically set at a slightly lower temperature than the front zone (~200° C.) to help begin the cooling process. The material flowed through the barrel and was pushed through a multi-orifice die with ~⅛" holes while the die face cutter rotated to slice the pellets. The speed of the cutter controls the length of the pellet to achieve uniform length to O.D. pellet, in this case ⅛"×⅛". Forced air is blown on the pellets to avoid bonding. The pellets were further dried at 60° C. for 4 hours, and then used as starting feedstock materials for the BAAM process. The characteristics of the Nd—Fe—B powders used were: Curie temperature $T_c$=360° C., intrinsic coercivity $H_{ci}$=716-836 kA/m, energy product $(BH)_{max}$~127 kJ/m$^3$, and theoretical density $\rho$=7.64 g/cm$^3$.

Big Area Additive Manufacturing (BAAM) Process

Three dimensional printing was performed at Manufacturing Demonstration Facility at Oak Ridge National Laboratory with the Big Area Additive Manufacturing (BAAM) system with a build volume of 3.56 m×1.65 m×0.86 m. The main components of the BAAM include the gantry system, single screw extruder, and a heated bed. The gantry uses linear drive motors to position the extruder with ±0.0254 mm accuracy and was operated at a constant velocity of 25.4 mm/s during the printing process. The extruder is 25 mm in diameter with an aspect ratio of 12 (i.e. length/diameter=12) and is used to melt nylon NdFeB composite pellets and deposit molten materials at a rate consistent with the gantry movement and desired bead profile. The temperature at the orifice exit of the extruder was approximately 270° C. The first layer was deposited on an acrylonitrile butadiene styrene (ABS) sheet that was placed on top of the heated aluminum table kept at a constant temperature of 90° C.

Figure 1:
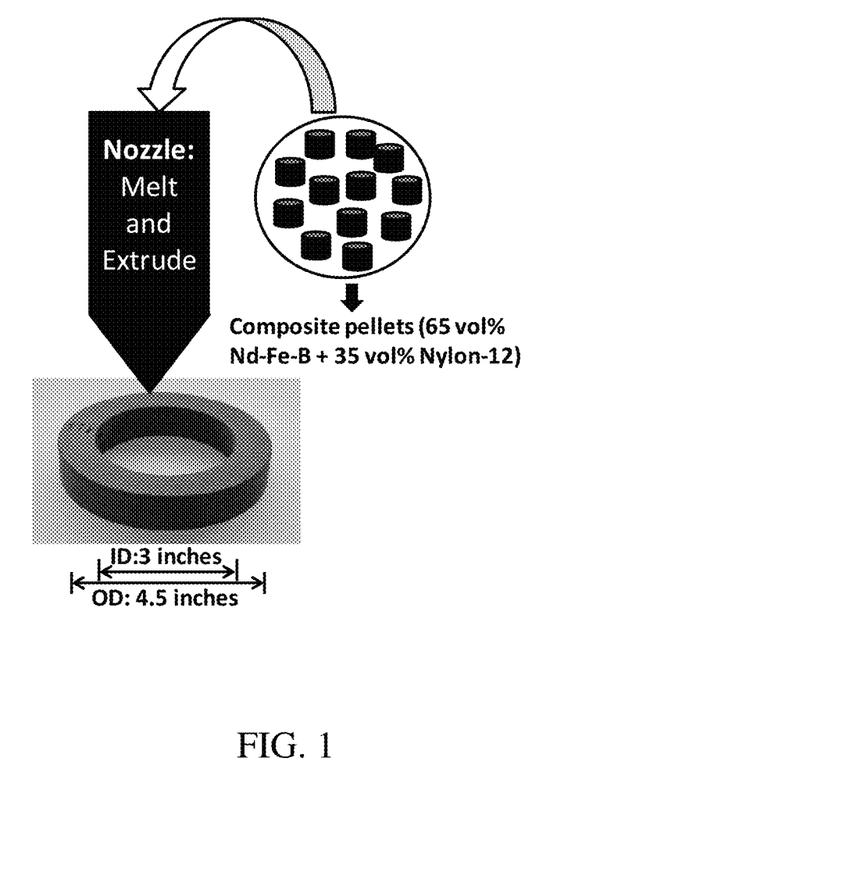
FIG. 1. Schematic of an exemplary melt and extrude process. Underneath the nozzle is a printed magnet in a hollow cylinder shape with an OD×ID of ~4.5 inch×3 inch.
Figure 2:
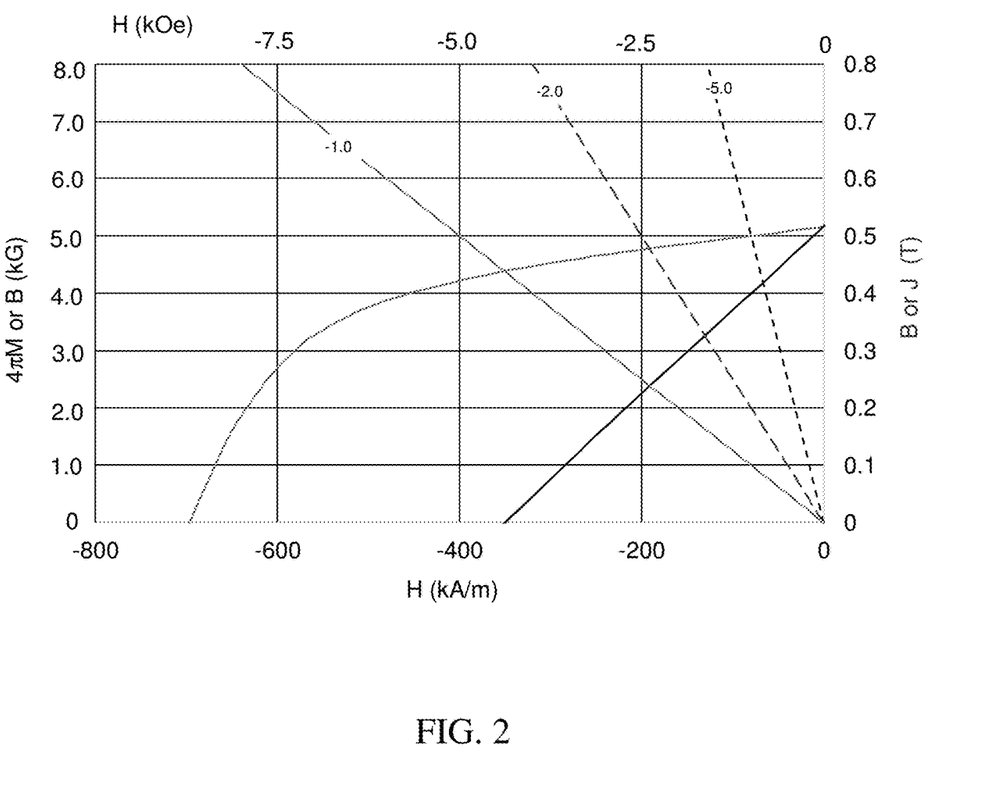
FIG. 2. Hysteresis loops of a BAAM printed NdFeB nylon composite magnet.

FIG. 1 shows the BAAM printing process of the bonded magnets: the nozzle deposits layers of magnetic materials which are fused together and solidify to form the desired shape. Instead of requiring pre-extruded filament feedstock commonly used in industry standard extrusion-based system, BAAM combines melting, compounding, and extruding functions to deposit polymer product at a controlled rate. The feedstock materials here are magnetic pellets composed of 65 vol % isotropic NdFeB powder (MQPB+) and 35 vol % Nylon-12. It is worth mentioning that the printing of the extruded nylon magnet composite flows even better than the widely explored 3D printing plastic filament acrylonitrile butadiene styrene (ABS), and renders high accuracy. The magnetic, mechanical, and microstructural properties of the BAAM fabricated bonded magnets are investigated and compared with respect to the traditional injection molded commercial products made from the same starting materials. The results obtained with the BAAM fabricated bonded magnets are much better than those of traditional injection molded magnets. The field dependence flux densities for the BAAM-manufactured magnet are shown in FIG. 2.

The magnetic properties of the BAAM-manufactured magnet do not show any observable degradation compared to those of the starting pellets. The density of the BAAM and injection molded magnets are 4.8 g/cm$^3$ and 4.9 g/cm$^3$, respectively. The BAAM magnet has the intrinsic coercivity $H_{ci}$=8.65 kOe, remanence $B_r$=5.07 kG, and saturation magnetization $4\pi M_s$≈7.40 kG. The results demonstrate that magnets did not degrade. The present method significantly simplifies manufacturing of near-net-shape bonded magnets, enables efficient use of rare earth elements, thus contributing towards enriching the supply of critical materials. In addition to 65 vol %, a higher percentage (e.g., at least 70 vol %) of MQPB+ magnetic particles can be included in the nylon polymer matrix.

The ability to create a near-net shaped magnet results in less post processing, less (nearly zero) waste generation, and a wide range of applications for a single manufacturing platform. In the above example, nylon-bonded Nd—Fe—B magnets with a high loading fraction of 70 vol. % were fabricated via an extrusion-based additive manufacturing process for the first time. The printed magnets exhibited superior magnetic properties, compared to injection molded magnets, while maintaining substantial geometry flexibility. Motors installed with the BAAM-produced printed magnets exhibited similar performance as compared to those installed with sintered ferrites. In addition, the extrusion-based additive manufacturing method via the BAAM system can be widely applied to net-shape manufacture other functional magnets, such as SmCo, SmFeN, $Fe_{16}N_2$, ferrites, and hybrids of more than one composition with binder materials such as nylon, PPS (polyphenylene sulfide), and other high temperature thermoplastics.

While there have been shown and described what are at present considered the preferred embodiments of the invention, those skilled in the art may make various changes and modifications which remain within the scope of the invention defined by the appended claims.

What is claimed is:

1. A method for producing a bonded permanent magnet, the method comprising:
   (i) blending thermoplastic polymer and particles having a hard magnetic material composition to produce a blended magnet-polymer mixture, wherein said thermoplastic polymer has a melting point of at least 175° C., and said particles having a hard magnetic material composition are present in said blended magnet-polymer mixture in an amount of at least 75 vol %;
   (ii) feeding said blended magnet-polymer mixture into a pre-feed hopper having a powered auger at an outlet of said pre-feed hopper, wherein said outlet feeds directly into an inlet of a temperature-controlled barrel extruder;
   (iii) feeding the blended magnet-polymer mixture from step (ii) into said temperature-controlled barrel extruder at a fixed feed rate of 5-20 kg/hour, pushing said blended magnet-polymer mixture from said inlet to an outlet of said temperature-controlled barrel extruder, and subjecting said blended magnet-polymer mixture to an increasing temperature from said inlet to said outlet of said temperature-controlled barrel extruder, wherein the temperature at said outlet is at least the glass transition temperature to no more than 10° C. above the glass transition temperature of said blended magnet-polymer mixture;
(iv) feeding said blended magnet-polymer mixture at said outlet of the barrel extruder directly into an extruding die, wherein said extruding die is set at a temperature below the temperature of said outlet of the barrel extruder and below the glass transition temperature of said blended magnet-polymer mixture, to cool and harden said blended magnet-polymer mixture;
(v) passing the blended magnet-polymer mixture from step (iv) through said extruding die at a fixed speed to produce a shaped and hardened form of said magnet-polymer mixture exiting said extruding die at said fixed speed;
(vi) cutting said shaped and hardened form of said magnet-polymer mixture at regular intervals as said shaped and hardened form of said magnet-polymer mixture exits said extruding die at said fixed speed, to produce hardened pellets of said magnet-polymer mixture, wherein said hardened pellets are of uniform size by virtue of said fixed speed and cutting at regular intervals; and
(vii) feeding said hardened pellets into an additive manufacturing device and operating said additive manufacturing device, by at least hot extruding said hardened pellets through a die or nozzle of said additive manufacturing device and repeatedly depositing discrete amounts of the extruded material in designated locations, to produce a bonded permanent magnet having the composition of said hardened pellets.

2. The method of claim 1, wherein said hardened pellets have a size of at least 1 millimeter.

3. The method of claim 1, wherein said particles having a hard magnetic material composition are magnetically isotropic.

4. The method of claim 1, wherein said particles having a hard magnetic material composition are magnetically anisotropic.

5. The method of claim 1, wherein said hard magnetic material composition comprises at least one element selected from iron, cobalt, nickel, and rare earth elements.

6. The method of claim 1, wherein said hard magnetic material composition contains a rare earth element.

7. The method of claim 6, wherein said hard magnetic material composition has a samarium-containing, neodymium-containing, or praseodymium-containing composition.

8. The method of claim 1, wherein said hard magnetic material composition has a $Nd_2Fe_{14}B$ composition.

9. The method of claim 1, wherein said thermoplastic polymer has a melting point of at least 180° C.

10. The method of claim 1, wherein said thermoplastic polymer is selected from the group consisting of polyamides, polyphenylene sulfide, polyphenylene oxide, acrylonitrile butadiene styrene, polyether ether ketone, polyoxymethylene, polyether sulfone, polycarbonates, polyetherimide, polyvinyl addition polymers, polyesters, and polybenzimidazole.

11. The method of claim 1, wherein said particles having a hard magnetic material composition are included in an amount of at least 80 vol % in step (i).

12. The method of claim 1, wherein said fixed feed rate is about 10 kg/hour.

13. The method of claim 1, wherein said increasing temperature from said inlet to said outlet of said temperature-controlled barrel extruder is provided by at least two temperature zones differing in temperature, wherein said temperature zones increase in temperature from said inlet to said outlet of the temperature-controlled barrel extruder, with the temperature of the temperature zone closest to said outlet at least the glass transition temperature to no more than 10° C. above the glass transition temperature of said blended magnet-polymer mixture.

14. The method of claim 1, wherein said temperature-controlled barrel extruder includes a twin screw compounder that compounds the blended magnet-polymer mixture from said inlet to said outlet of the temperature-controlled barrel extruder.

15. The method of claim 1, wherein said additive manufacturing device is a big area additive manufacturing (BAAM) system, the method comprising:
(i) incorporating said hardened pellets into at least one deposition head of at least one multi-axis robotic arm of a BAAM system, wherein said deposition head performs melting, compounding, and extruding functions, and said BAAM system has an unbounded open-air build space; and
(ii) depositing an extrudate of said hardened pellets from said deposition head, said extrudate being at a temperature above the glass transition temperature of said hardened pellets when exiting an orifice of said deposition head, and depositing said extrudate layer-by-layer from said deposition head until an object is formed with said extrudate, and allowing the extrudate to cool after each deposition, to produce said bonded permanent magnet.

16. The method of claim 15, wherein the particles having a hard magnetic material composition are magnetically isotropic.

17. The method of claim 15, wherein the particles having a hard magnetic material composition are magnetically anisotropic.

18. The method of claim 17, wherein said extrudate is exposed to a directional magnetic field as the extrudate exits from the nozzle and is deposited, wherein said directional magnetic field is of sufficient strength to align the magnetically anisotropic particles having a hard magnetic material composition.

19. The method of claim 15, wherein said deposition head of at least one multi-axis robotic arm coordinates with at least one other multi-axis robotic arm having another deposition head to produce said bonded permanent magnet.

20. The method of claim 15, wherein said deposition head of at least one multi-axis robotic arm follows instructions from a computer program to deposit said extrudate in precise locations.

21. The method of claim 1, wherein said bonded permanent magnet has a shape of a component of a functional motor, engine, or turbine.

22. The method of claim 1, wherein said bonded permanent magnet retains the magnetic properties of the particles having a hard magnetic material composition without a loss in said magnetic properties.

23. The method of claim 1, wherein said bonded permanent magnet is coated with a polymer that functions to reduce exposure of the bonded permanent magnet to oxygen.

24. The method of claim 23, wherein said polymer is an epoxy-based polymer.

25. The method of claim 1, wherein said particles having a hard magnetic material composition are present in said blended magnet-polymer mixture in an amount of greater than 75 vol %.

26. The method of claim 1, wherein said particles having a hard magnetic material composition have an ovoid, filamentous, or plate-like shape.

\* \* \* \* \*